April 28, 1953 W. R. HARRIS ET AL 2,637,006
MOTOR CONTROL SYSTEM
Filed June 29, 1950
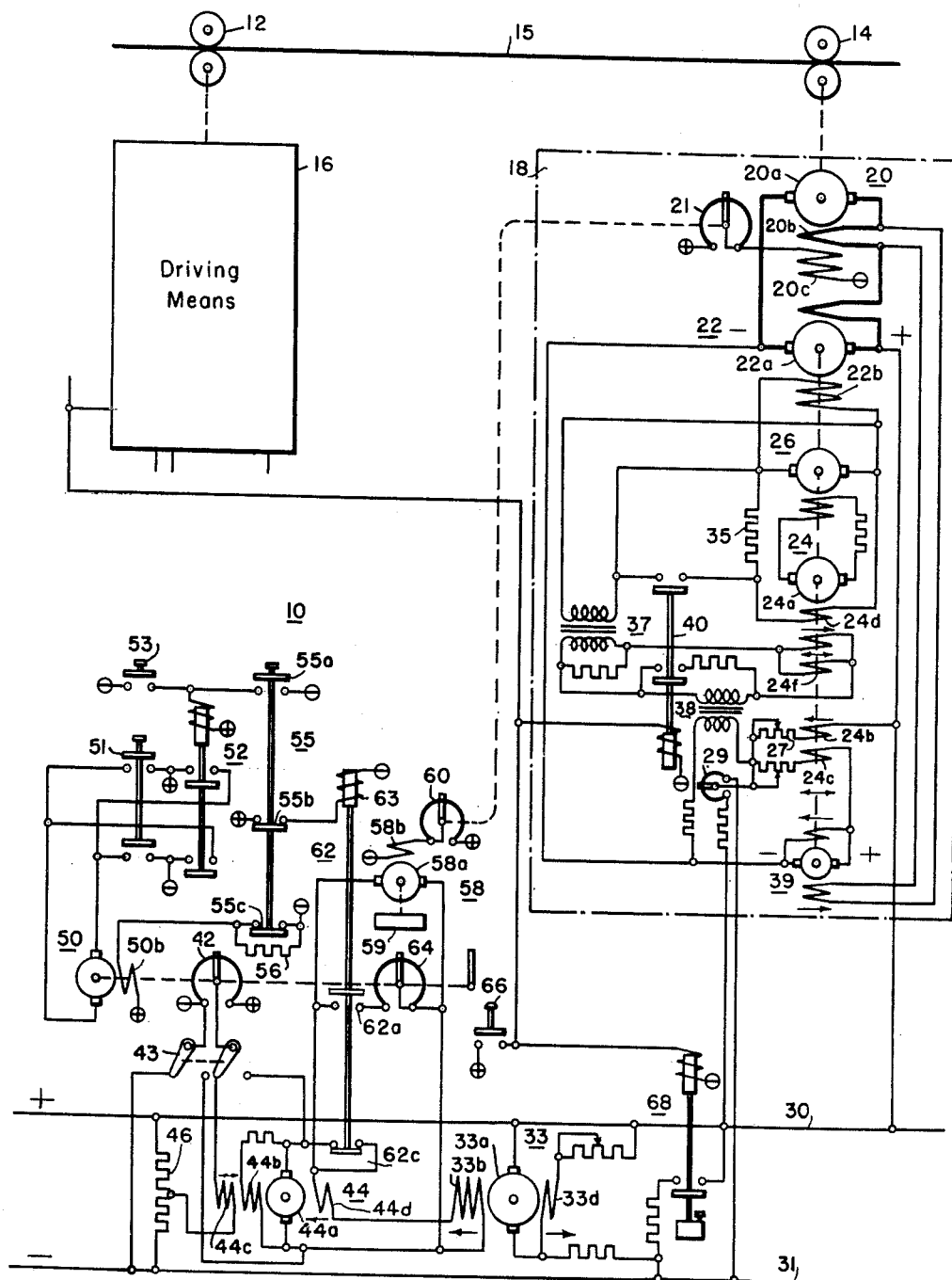
WITNESSES:
E. A. McCloskey
F. V. Giolma
INVENTORS
Walter Schaelchlin, Walter R. Harris
and Raymond W. Moore.
BY
G. D. Crawford
ATTORNEY Patented Apr. 28, 1953

2,637,006

UNITED STATES PATENT OFFICE 2,637,006

MOTOR CONTROL SYSTEM

Walter R. Harris and Raymond W. Moore, Pittsburgh, Pa., and Walter Schaelchlin, Buffalo, N. Y., assignors to Westinghouse Electric Corporation, East Pittsburgh, Pa., a corporation of Pennsylvania Application June 29, 1950, Serial No. 171,204

10 Claims. (Cl. 318—150)

Our invention relates, generally, to motor control systems, and it has reference, in particular, to an emergency stop system for a plurality of motors, such as may be used in driving the roll stands of a tandem strip mill or the like.

Generally stated, it is an object of our invention to provide an emergency stop system for a plurality of motors, which is simple and inexpensive to manufacture and is reliable and effective in operation.

More specifically, it is an object of our invention to provide, in an emergency stop system, for quickly and effectively bringing a motor to a stop at a rate which is dependent on the motor speed.

Another object of our invention is to provide, in an emergency stop system for a plurality of motors, for varying a common reference voltage which determines the speeds of the motors, at a rate which is inverse with respect to the speed of a predetermined one of the motors.

Yet another object of our invention is to provide, in a control system for a plurality of roll stand or mill motors in a tandem strip mill, for utilizing a flywheel motor to control the rate of change of a common reference voltage which determines the speeds of the motors.

It is also an important object of our invention to provide, in an emergency stop system for a plurality of motors disposed to operate at different speeds, for utilizing a flywheel motor energized from a common reference bus for controlling the rate of deceleration of the motors.

Another important object of our invention is to provide, in an emergency stop system for a tandem strip mill, for utilizing a flywheel motor energized from a source of reference voltage to control the rate of reduction of the common reference voltage in stopping the mill.

A further object of our invention is to provide, in an emergency stop system for a motor, for utilizing dynamic braking to modify the rate of decay of a reference voltage determining the speed of the motor, as determined by a flywheel motor which supplies regenerative energy to determine the field excitation of a reference exciter producing the reference voltage.

We further propose in an emergency stop system for a plurality of roll stand motors in a tandem strip mill, for utilizing the stored energy of a flywheel motor for controlling the rate of deceleration of the mill and for varying the field excitation of the flywheel motor in accordance with the field strength of the motor of the last stand so as to determine the rate of deceleration in accordance with the speed of the last stand.

Other objects will, in part, be obvious and will, in part, be explained hereinafter.

In practicing our invention according to one of its embodiments, the speeds of the several roll stand or mill motors of a tandem strip mill are controlled jointly by utilizing a common reference exciter for producing a reference voltage for controlling the operation of regulating generators which regulate the field excitation of separate main generators supplying electrical energy to the motors individually. A flywheel motor has its armature connected in shunt circuit relation with the field winding of the reference exciter so as to be normally energized from a regulating generator supplying field excitation to the reference exciter. In making an emergency stop, the regulating generator is disconnected from the field winding of the reference exciter, which is thereafter energized from the flywheel motor by reason of the stored energy of the flywheel motor. The speed of the flywheel motor is varied with the field strength of the last roll stand motor so as to determine the stopping rate of the mill in accordance with the speed of said motor. Dynamic braking is used to modify the normal retardation curve of the flywheel motor from an exponential curve to approximately a straight line, thus modifying the stopping rate of the mill.

For a more complete understanding of the nature and scope of our invention, reference may be made to the following detailed description, which may be read in connection with the accompanying drawing, in which the single figure is a diagrammatic view of a control system for a tandem mill embodying the invention in one of its forms.

Referring to the drawing, the reference numeral 10 may denote generally an emergency stop control system disposed to provide for effectively stopping the roll stands 12 and 14 which may be representative of the several stands of a tandem mill, which may be disposed to work upon a strip of material 15 passing between the rolls of the stands.

The roll stands 12 and 14 may be provided with suitable driving means designated generally by the numerals 16 and 18. Since the driving means of the several stands may be substantially identical, only the driving means 18 for the last stand 14 will be illustrated in detail, it being understood that the driving means for the other stands may be substantially identical therewith.

The roll stand 14 may, for example, be provided with driving means including a mill motor 20 having an armature 20a, a series field winding 20b, and a separately excited main field winding 20c, which may be connected to a suitable source of electrical energy through a field rheostat 21. Electrical energy may be supplied to the armature 20a from a main generator 22, which is individual to the mill motor 20 and has an armature 22a and a field winding 22b.

The voltage applied to the mill motor 20 by the main generator 22 may be determined by utilizing a regulating generator 24 to control the output voltage of an exciter 26 which supplies electrical energy to the field winding 22b of the main generator. The regulating generator 24 may comprise an armature 24a, a basic excitation field winding 24b, a control field winding 24c, a differential field winding 24d, and damper field windings 24f.

The basic excitation field winding 24b may be connected through a control resistor 27 and a potentiometer device 29 to a source of reference voltage, such as the reference bus conductors 30 and 31 which may be common to all of the mill motors, being, for example, supplied with electrical energy from a reference exciter 33 having an armature 33a, a main field winding 33b, and a differential field winding 33d.

The control field winding 24c may be connected to the reference bus conductors 30 and 31 through the potentiometer device 29, and to one output terminal of the main generator 22, so as to be reversibly energized in accordance with a differential between the voltage of the main generator 22 and the voltage derived from the reference bus conductors 30 and 31.

The differential field winding 24d may be connected across the armature of the exciter 26 in series circuit relation with a control resistor 35 so as to be energized differentially with respect to the basic excitation field winding 24b. The damper field windings 24f may be reversibly energized in accordance with the rate of change of voltage of the exciter 26, and the rate of change of the differential between the voltage of the main generator 22 and that portion of the reference bus voltage determined by the potentiometer 29, to which the generator voltage is compared, by energizing them from damping transformers 37 and 38.

An IR drop exciter 39 energized in accordance with the armature current of the mill motor 20 may be connected in circuit relation with the control field winding 24c in such a direction as to increase the voltage of the main generator 22 with increased load. A control relay 40 may be provided for shunting the control resistor 35 and short-circuiting the damping transformer 38 during an emergency stop of the mill.

In order to provide for controlling the speed of the mill, the reference voltage produced by the reference exciter 33 may be normally controlled by connecting the field winding 33b either to a variable voltage source such as the potentiometer or master rheostat 42 through a switch 43 or by utilizing a regulating generator 44 for determining the excitation of the reference exciter field winding 33b. The regulating generator 44 may be provided with a control field winding 44c, a series field winding 44d and an opposing antihunt shunt field winding 44b.

The control field winding 44c may be connected to the reference bus conductors 30 and 31 by means of a voltage divider 46, and by means of the switch 43 to the potentiometer device 42, which may be provided with an operating motor 50, so as to be reversibly energized in response to a differential therebetween. Operation of the motor 50 to actuate the potentiometer device 42 in a direction to raise or lower the voltage of the reference exciter 33 may be provided for by means of a "raise" push button switch 51, and a "lower" control relay 52 in conjunction with a "lower" push button switch 53.

In order to provide for stopping the mill in an emergency, an emergency stop switch 55 may be provided having a contact member 55a for effecting operation of the "lower" control relay 52 and a contact member 55c for inserting a control resistor 56 in circuit relation with the field winding 50b of the operating motor 50 to increase the rate of reduction of the reference voltage.

With a view to controlling the rate of deceleration of the mill during an emergency stop, a flywheel motor 58 may be provided, having an armature 58a connected in driving relation with a flywheel 59, and a field winding 58b. The armature 58a may be connected in shunt circuit relation with the field winding 33b of the reference exciter 33 so as to be normally energized from the regulating generator 44, or the potentiometer 42, in accordance with the value of the reference voltage. The field winding 58b may be connected to a suitable source of electrical energy through a field rheostat 60.

In order to determine the rate of deceleration of the mill in accordance with the speed of the mill motor having the highest armature peripheral velocity or the greatest stand energy, which will usually be the mill motor of the last stand, for example, stand 14, the field rheostat 60 may be mechanically coupled with the field rheostat 21 of the mill motor 20 of the last stand, so as to vary the speed of the flywheel motor 58 and maintain it proportional to the speed of the mill motor 20.

In order to control the stopping of the mill, a transfer relay 62 having an operating winding 63 may be provided. The transfer relay 62 may be normally energized and disposed to normally connect the armature 44a of the regulating generator 44 to the field winding 33b of the reference exciter through contact member 62c. The operating winding 63 may be connected for energization through contact member 55b of the emergency stop switch 55 so as to effect operation of the relay to disconnect the regulating generator 44 from the field winding 33b when the switch 55 is actuated.

The transfer relay 62 may also be disposed, when in its deenergized position, to connect a potentiometer device 64 across the armature 58a of the flywheel motor through contact member 62a, so as to provide a circuit for dynamically braking the flywheel motor to modify its rate of retardation. The potentiometer device 64 may be operatively connected to the potentiometer device 42 so as to increase the dynamic braking effect as the reference voltage is lowered.

A limit switch 66 may be utilized to effect operation of a time delay relay 68, having delayed operating characteristics for shunting the reference bus conductors 30 and 31 to reduce the voltage thereof to a minimum, a predetermined time after the potentiometer device 42 reaches the minimum voltage operating position.

In normal operation, the speeds of the several mill stands will be determined by the actions of their respective regulating generators, such as, for example, the action of the regulating generator 24 of the mill stand 14 in matching the voltage of the main generator 22 against the reference voltage.

When it is desired to slow the mill down to a normal rate, the "lower" push button switch 53 may be actuated. This provides an obvious energizing circuit for the control relay 52, so as to effect operation of the motor 50 to operate the potentiometer device 42 in a direction such as to reduce the output voltage of the regulating generator 44, and hence the voltage of the reference exciter 33. All of the stands will be controlled thereby, as the regulating generator 24 of stand 14, for example, thereupon regulates the voltage of the main generator 22, and reduces it in accordance with the reduction of the reference voltage so as to reduce the speed of the stand.

To make an emergency stop, the emergency stop push button switch 55 may be actuated. This provides an obvious energizing circuit for the "lower" relay 52, thus effecting operation of the motor 50 in a direction to reduce the voltage of the reference exciter 33. Operation of the emergency stop switch 55, however, also effects operation of the transfer relay 62. The regulating generator 44 is thereupon disconnected from the field winding 33b of the reference exciter at contact members 62c. The field winding 33b thereupon receives its excitation from the armature 58a of the flywheel motor 58 which now functions as a flywheel generator. Since the field excitation of the flywheel motor 58 is proportional to the field excitation of the mill motor 20, the stored energy of the flywheel motor, and hence the stopping time of the mill will be proportional to the speed of the mill motor 20.

Operation of the transfer relay 62 provides a dynamic braking circuit for the flywheel motor 58 through the potentiometer device 64. Accordingly, the normal exponential retardation curve of the flywheel motor 58 is modified by the dynamic braking, so as to provide a substantially straight line retardation. A predetermined time after the potentiometer device 42 reaches the minimum reference voltage position, the time delay relay 68 operates to shunt the reference bus conductors and insure against any creeping of the mill stand because of residual voltage output of exciter 33.

From the above description and the accompanying drawing, it will be apparent that we have provided in a simple and effective manner for stopping the several motors of a mill so as to automatically obtain the maximum rate of stopping over the field range of the motor of the governing stand which in this case may be the last stand. By utilizing dynamic braking on the flywheel motor, the normal exponential retardation curve of the motor and hence the stopping rate of the mill may be changed to a substantially straight line relation. By utilizing a differential shunt field on the reference exciter, the time constant of the exciter may be greatly reduced so that the reference bus may be shorted when the master rheostat is in the zero reference voltage position.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. A control system for a motor comprising, regulating means connected to supply electrical energy to the motor in accordance with a variable reference voltage, a reference generator having field excitation means, said reference generator being connected to produce said reference voltage, circuit means disposed to be connected to said field excitation means for normally supplying electrical energy thereto, a flywheel motor connected in shunt circuit relation with the field excitation means, and means for interrupting said circuit means so that the flywheel motor by regeneration determines the rate of reduction of energization of said field excitation means.

2. In a control system for a motor, control means including an exciter having field excitation means disposed to produce a reference voltage to control the speed of the motor, switch means operable to connect the field excitation means to a source of electrical energy to control the output voltage of the exciter and to disconnect it therefrom, rheostat means operable to different positions to vary the voltage of the source, a flywheel motor connected in shunt relation with the field excitation means to be normally energized from the source and to supply electrical energy to effect energization of the field excitation means to maintain a predetermined normal rate of decay of the reference voltage when the field excitation means is disconnected from the source, and circuit means connected to provide a dynamic braking circuit for the flywheel motor in accordance with the operating position of said rheostat.

3. The combination with a motor, of generator means connected to supply electrical energy to the motor including a reference exciter having a field winding, said reference exciter being connected to produce a reference voltage to determine the speed of the motor, switch means operable to connect the exciter field winding to a source of electrical energy, control means operable to different positions to vary the voltage of the source, a flywheel motor connected in shunt circuit relation with said exciter field winding, adjustable resistance means adjustable in accordance with the operating position of the control means, circuit means including contact means of said switch means for connecting said resistance means to provide a dynamic braking circuit for the flywheel motor, and emergency stop means operable to effect operation of the control means to reduce the output voltage of the generator and effect operation of the switch means to disconnect said field winding from the source.

4. An emergency stop system for a motor having regulating means responsive to the value of a variable reference voltage to control the speed of the motor comprising, control means including a generator having field excitation means disposed to be connected to a source to produce the reference voltage, rheostat means operable to vary the energization of the field excitation means and hence the reference voltage, a flywheel motor connected in shunt relation with the field excitation means, said flywheel motor being disposed to utilize stored energy to maintain the reference voltage according to a predetermined pattern, a rheostat operative with the aforesaid rheostat means, and switch means selectively operable to connect the field excitation means to the source and connect the rheostat means to provide a dynamic braking circuit for the flywheel motor to modify the predetermined pattern.

5. The combination with a main motor having an armature and a field winding, of a field rheostat connecting said winding to a source of electrical energy, a main generator connected to supply electrical energy to the main motor, an exciter connected to control the supply of electrical energy to the generator, said exciter having a field winding, a regulating generator, a master rheostat operable to vary the output voltage of the regulating generator, switch means operable to connect the regulating generator to energize the exciter field winding, a flywheel motor having a field winding and an armature connected in shunt circuit relation with the exciter field winding, and circuit means including a rheostat connecting the field winding of the flywheel motor to a source of electrical energy, said rheostat being operatively connected with the field rheostat of the main motor.

6. In combination with a plurality of roll stand motors for a tandem mill, each of said motors having an armature and a field winding, a field rheostat connecting each one of said field windings to a source of electrical energy, a main generator individual to each motor connected to supply electrical energy to the armature thereof, control means including a regulating generator individual to each motor to control the output voltage of the respective main generator, a common reference exciter connected to apply a reference voltage to each of the regulating generators, said exciter having a field winding, switch means connecting said field winding of the exciter to a source of electrical energy, a master rheostat operable to vary the voltage applied to said field winding from said source, a flywheel motor having a field winding and an armature connected in shunt relation with the field winding of the exciter, circuit means including contact means of said switch means connected to provide a dynamic braking circuit for the flywheel motor including a rheostat operatively connected with the master rheostat, and additional circuit means connecting the field winding of the flywheel motor to a source of electrical energy including a rheostat operatively connected with the field rheostat of the motor of the last roll stand.

7. In a control system for a variable voltage reference exciter for a plurality of roll stand motors, said exciter having a field winding, a regulating generator having an armature and a field winding, a master rheostat operable to produce a variable voltage, circuit means connecting the regulator generator field winding to the master rheostat and the armature of the exciter in opposed senses, switch means operable to connect the regulating generator to effect energization of the exciter field winding, and a flywheel motor connected in shunt circuit relation with the exciter field winding between the switch means and said field winding.

8. The combination with a generator having field excitation means, of switch means operable to connect the field excitation means of the generator to and disconnect it from a source of electrical energy, and a flywheel motor connected between the switch means and the field excitation means to supply electrical energy to the field excitation means according to a predetermined pattern when the switch means disconnects the field excitation means from the source.

9. A control system for a generator having field excitation means comprising, a regulating generator, switch means operable to connect the regulating generator to the field excitation means and to disconnect it therefrom, and a flywheel motor connected in shunt circuit relation with the regulating generator and the field excitation means between said excitation means and the switch means to supply electrical energy to said excitation means when said switch means disconnects the regulating generator from the field excitation means.

10. The combination with a plurality of roll stand motors in a tandem mill, of a plurality of main generators connected to supply electrical energy individually to each motor, regulating means individual to each main generator connected to regulate the output voltage thereof, a common reference exciter having a field winding and an armature connected to supply a common reference voltage to all of the regulating means, a regulating generator having an armature and a field winding, a master rheostat operable to produce a variable control voltage, circuit means connecting the field winding of the regulating generator to the master rheostat and the armature of the reference exciter in opposed relations, an auxiliary rheostat mechanically coupled with the master rheostat, a flywheel motor having a field winding and having an armature connected across the field winding of the exciter, circuit means connecting the flywheel motor field winding to a source of electrical energy including a rheostat operable in accordance with the field excitation of the motor of the last mill stand, switch means operable in one position to connect the armature of the regulating generator to supply electrical energy to the armature of the flywheel motor and the exciter field winding and to another position to connect the auxiliary rheostat across the armature of the flywheel motor, and control means operable in response to operation of the master rheostat to reduce the reference voltage to a minimum value by providing a shunt circuit across the armature of the reference exciter.

WALTER R. HARRIS.
RAYMOND W. MOORE.
WALTER SCHAELCHLIN.

References Cited in the file of this patent
UNITED STATES PATENTS

| Number | Name | Date |
|---|---|---|
| 927,173 | Seede | July 6, 1909 |